United States Patent
Ausseresse

(10) Patent No.: US 9,705,414 B2
(45) Date of Patent: Jul. 11, 2017

(54) SYSTEM AND METHOD FOR ZERO VOLTAGE SWITCHING IN CONTINUOUS CONDUCTANCE MODE (CCM) FLYBACK CONVERTERS

(71) Applicant: Infineon Technologies Austria AG, Villach (AT)

(72) Inventor: Pierrick Ausseresse, Munich (DE)

(73) Assignee: Infineon Technologies Austria AG, Villach (AT)

(*) Notice: Subject to any disclaimer, the term of this patent is extended or adjusted under 35 U.S.C. 154(b) by 69 days.

(21) Appl. No.: 14/575,294

(22) Filed: Dec. 18, 2014

(65) Prior Publication Data

US 2016/0181926 A1 Jun. 23, 2016

(51) Int. Cl.
*H02M 3/335* (2006.01)
(52) U.S. Cl.
CPC ............... *H02M 3/33576* (2013.01)
(58) Field of Classification Search
CPC ............. H02M 3/335; H02M 3/33507; H02M 3/33523; H02M 3/33592
USPC .............................. 363/20–31, 127
See application file for complete search history.

(56) References Cited

U.S. PATENT DOCUMENTS

| | | | | |
|---|---|---|---|---|
| 4,870,555 A | * | 9/1989 | White | H02M 3/33592 363/127 |
| 9,143,040 B2 | * | 9/2015 | Lee | H02M 3/33507 |
| 2003/0218892 A1 | * | 11/2003 | Nakagawa | H02M 3/33569 363/56.12 |
| 2006/0120114 A1 | * | 6/2006 | Kawasaki | H02M 3/33592 363/16 |
| 2006/0152950 A1 | * | 7/2006 | Reddy | H02M 1/15 363/39 |
| 2012/0187869 A1 | * | 7/2012 | Angelin | H02M 3/33523 315/307 |

(Continued)

FOREIGN PATENT DOCUMENTS

KR 10-2014-0106820 * 8/2014 ........ H02M 3/33576

OTHER PUBLICATIONS

Adib, E., et al., "New Zero Voltage Switching PWM Flyback Converter," 2010 1st Power Electronic & Drive Systems & Technologies Conference (PEDSTC), Tehran, Iran, Feb. 17-18, 2010, pp. 196-200.

(Continued)

*Primary Examiner* — Alex Torres-Rivera
(74) *Attorney, Agent, or Firm* — Slater Matsil, LLP

(57) ABSTRACT

It is possible to achieve zero-voltage switching in continuous conductance mode (CCM) flyback converters by reducing the voltage differential across the primary winding immediately prior to transitioning the primary circuit from the off-state to the on-state. In one example, the voltage differential is reduced to the extent that polarity across the primary winding is reversed. In another example, the voltage differential across the primary winding is reduced significantly, but not to the extent that the polarity is reversed. Reducing the voltage differential across the primary winding may reduce a voltage potential across a current path of a switching transistor (e.g., a source-drain in a FET transistor) used to transition the primary circuit from the off-state to the on-state, which may decrease the parasitic power loss when the switching transistor is activated (closed).

19 Claims, 14 Drawing Sheets

(56) References Cited

U.S. PATENT DOCUMENTS

2015/0171759 A1* 6/2015 Scarlatescu ....... H02M 3/33523
363/21.09
2016/0049879 A1* 2/2016 Park .................. H05B 33/0815
363/21.1

OTHER PUBLICATIONS

Chen, S., et al., "A Transformer Assisted ZVS Scheme for Flyback Converter," Twentieth Annual IEEE Applied Power Electronics Conference and Exposition, Mar. 6-10, 2005, vol. 2, pp. 678-682.

* cited by examiner

SYSTEM AND METHOD FOR ZERO VOLTAGE SWITCHING IN CONTINUOUS CONDUCTANCE MODE (CCM) FLYBACK CONVERTERS

TECHNICAL FIELD

The present disclosure relates generally to an electronic device, and more particularly to a system and method for zero voltage switching in continuous conductance mode (CCM) flyback converters.

BACKGROUND

Power supply systems are pervasive in many electronic applications from computers to automobiles. Generally, voltages within a power supply system are generated by performing a DC-DC, DC-AC, and/or AC-DC conversion by operating a switch loaded with an inductor or transformer. One class of such systems includes switched mode power supplies (SMPS). An SMPS is usually more efficient than other types of power conversion systems because power conversion is performed by controlled charging and discharging of the inductor or transformer and reduces energy lost due to power dissipation across resistive voltage drops.

A SMPS usually includes at least one switch and an inductor or transformer. A flyback converter is one type of SMPS that achieves voltage conversion with galvanic isolation between the input and any outputs. Like other SMPS, flyback converters can operate in a continuous conduction mode (CCM) or a discontinuous conduction mode (DCM).

SUMMARY OF THE INVENTION

Technical advantages are generally achieved, by embodiments of this disclosure which describe a system and method for zero voltage switching in continuous conductance mode (CCM) flyback converters.

In accordance with an embodiment, a method of operating a switched mode power supply is provided. In this example, the method comprises de-activating a first switch coupled to a primary winding of a transformer in a switched-mode power supply to create a voltage difference across the primary winding of the transformer. The transformer comprises a secondary winding that includes at least a first winding portion coupled in series with a second winding portion. A series inductor is coupled to the second winding portion of the secondary winding. The method further includes activating a second switch to generate a current imbalance between the first winding portion and the second winding portion of the secondary winding. A load path of the second switch is coupled to a common node that is common to both the first winding portion and the second winding portion of the secondary winding. The method further includes de-activating the second switch to reduce a voltage difference across the first winding portion of the secondary winding, and re-activating the first switch to initiate charging of the transformer in the switched-mode power supply after the de-activating the second switch.

In accordance with another embodiment, a semiconductor device is provided. In this example, the semiconductor device comprises a monitoring circuit adapted to monitor a component in a switched-mode power supply and a switch timing circuit coupled to the monitoring circuit. A transformer in the switched mode power supply includes a primary winding coupled to a primary-side switch, and a secondary winding that includes at least a first winding portion coupled in series with a second winding portion. A series inductor is coupled to the second winding portion of the secondary winding. The switch timing circuit adapted to control at least a secondary-side switch having a load path coupled to a common node positioned in-between the first winding portion and the second winding portion of the secondary winding. The switch timing circuit is configured to activate the secondary-side switch to create a current imbalance between the first winding portion and the second winding portion from energy stored in the series inductor, and to de-activate the secondary-side switch to produce a voltage potential at the common node from the current imbalance between the first winding portion and the second winding portion. Producing the voltage potential at the common node reduces a voltage difference across the first winding portion of the secondary winding.

In accordance with yet another embodiment, a switched mode power supply is provided. In this example, the switched mode power supply comprises a transformer comprising a secondary winding having at least a first winding portion and a second winding portion. The switched mode power supply further comprises a primary-side switch coupled to a primary winding of the transformer, and a secondary-side switch coupled to a common node positioned in-between the first winding portion and the second winding portion of the secondary winding. The switched mode power supply further comprises a series inductor coupled to the secondary winding. The second winding portion of the secondary winding is coupled between the common node and the series inductor.

BRIEF DESCRIPTION OF THE DRAWINGS

For a more complete understanding of the present invention, and the advantages thereof, reference is now made to the following descriptions taken in conjunction with the accompanying drawings, in which.

Figure 1:
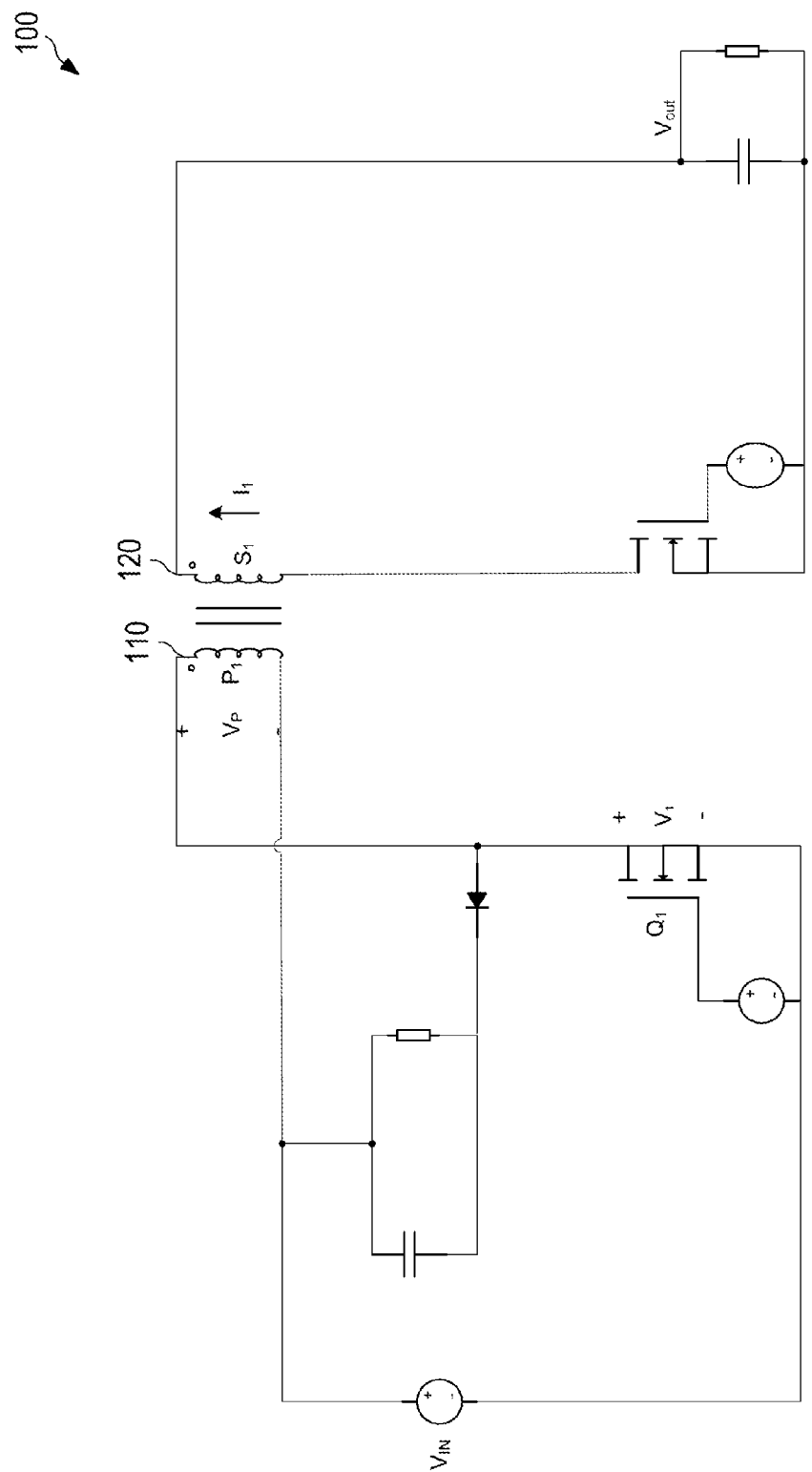
FIG. 1 illustrates a diagram of a conventional flyback converter architecture.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, a system and method for a switched-mode power supply in a flyback configuration. Embodiments of the present invention may also be applied to other switched-mode power supply configurations and other systems and applications including other circuits that switch including, but not limited to power systems and motor control systems.

Generally speaking, zero-voltage switching is advantageous when switching power from a high voltage source, as it reduces power leakage through parasitic capacitance when transitioning the primary circuit from the off-state to the on-state. Conventional DCM flyback converters may achieve zero-voltage switching when the transformer is completely discharged prior to transitioning the primary circuit to the on-state, which may become difficult as the input voltage increases, e.g., as in the case of quasi-resonant mode flyback converters. Conversely, conventional CCM flyback converter architectures may be unable to achieve zero-voltage switching because the transformer remains at least partially charged when transitioning the primary circuit from the off-state to the on-state. Accordingly, techniques for achieving zero-voltage switching in CCM flyback converters are desired.

Aspects of this disclosure provide embodiment CCM flyback converters architectures that achieve zero-voltage switching. This may be advantageous in so far as it allows CCM architectures to operate at (or near) DCM efficiency while still enjoying CCM related benefits, e.g., smaller passive components sizes, etc. An embodiment achieves zero-voltage switching by reducing the voltage differential across the primary winding immediately prior to transitioning the primary circuit from the off-state to the on-state. In one example, the voltage differential is reduced to the extent that polarity across the primary winding is reversed. In another example, the voltage differential across the primary winding is reduced significantly, but not to the extent that the polarity is indeed reversed. Reducing the voltage differential across the primary winding may reduce a voltage potential across a current path of a switching transistor (e.g., a source-drain in a FET transistor) used to transition the primary circuit from the off-state to the on-state. As a result of reducing that voltage potential, there is less parasitic power loss when the switching transistor is activated (closed) to transition the primary circuit from the off-state to the on-state. One technique for reducing the voltage differential across the primary winding is to create a current imbalance across different portions of the secondary winding. These and other details are discussed in greater detail below.

Conventional CCM flyback converters may be unable to achieve zero-voltage switching because the transformer remains at least partially charged when transitioning the primary circuit from the off-state to the on-state. FIG. 1 illustrates a conventional flyback converter architecture 100 for converting an input voltage ($V_{IN}$) to an output voltage ($V_{out}$). The conventional flyback converter architecture 100 includes primary circuit, a secondary circuit, and a transformer for transferring electromagnetic energy from the primary circuit to the secondary circuit. As shown, the primary circuit comprises a primary switching transistor ($Q_1$) and a primary winding 110 of the transformer, while the secondary circuit includes a secondary winding 120 of the transformer. The primary switching transistor ($Q_1$) is activated (e.g., closed) to initiate a charging of the primary winding 110, and de-activated (e.g., opened) to initiate a transfer of electromagnetic energy stored in the primary winding 110 to the secondary winding 120. Notably, a voltage differential ($V_P$) is created across the primary winding 110 when the switching transistor ($Q_1$) is de-activated (e.g., opened), which induces a current flow through the secondary circuit as well as builds a voltage potential ($V_1$) between the drain and source terminals of the switching transistor ($Q_1$). When the switching transistor ($Q_1$) is re-activated (e.g., closed) to re-charge the primary winding 110, the voltage potential ($V_1$) dissipates across the drain-source path of the primary switching transistor ($Q_1$), which constitutes a parasitic power loss that reduces the operating efficiency of the conventional flyback converter architecture 100.

Aspects of this disclosure mitigate much of the aforementioned parasitic power loss through zero-voltage switching. Specifically, embodiment techniques reduce the voltage differential across the primary winding prior to re-activation of the primary switching transistor, which substantially discharges the voltage potential ($V_1$) into the primary winding of the transformer, thereby allowing the primary switching transistor to be re-activated at (or near) a zero voltage state.

Figure 2A:
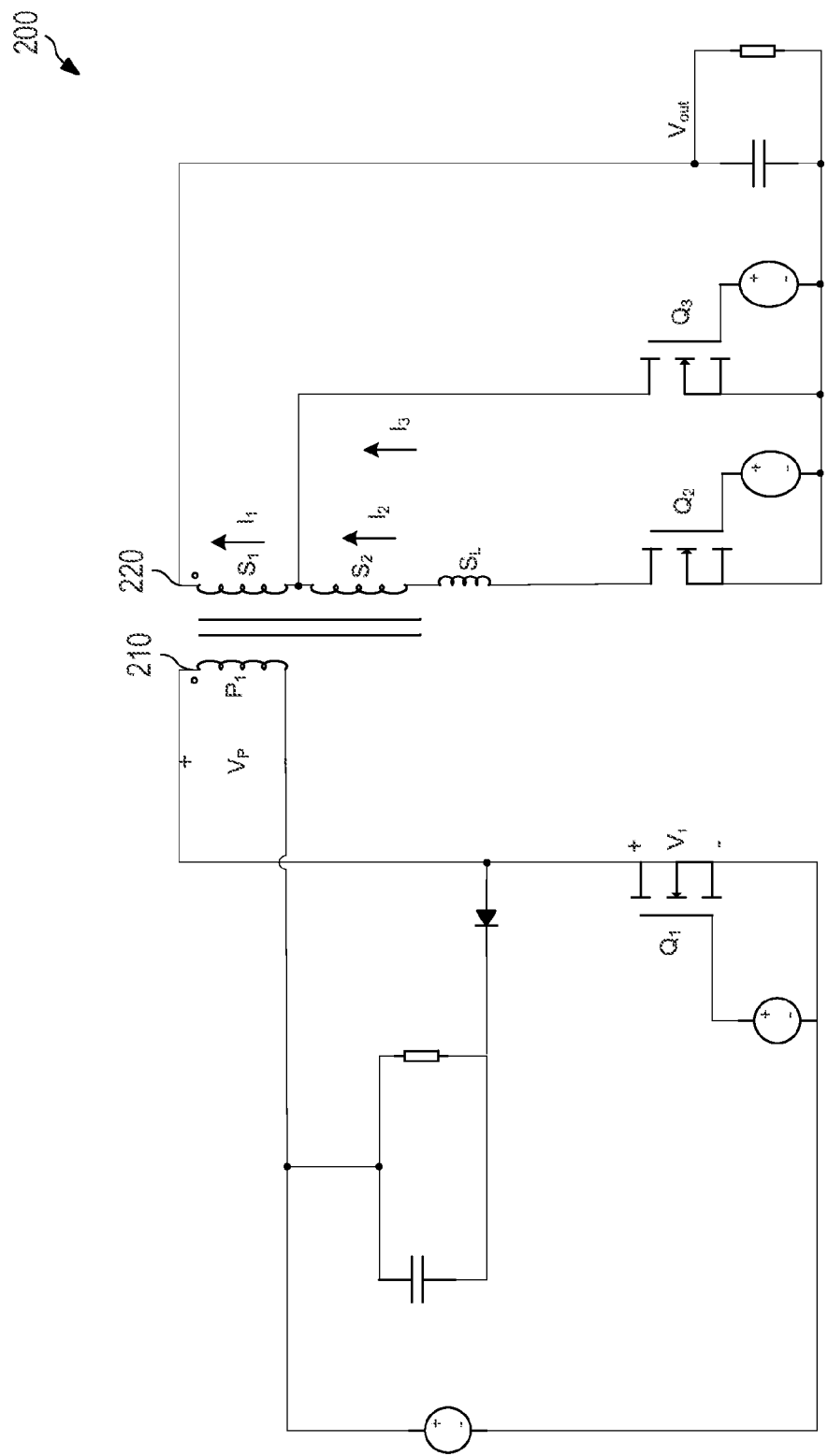
FIGS. 2A-2C illustrate diagrams of embodiment flyback converter architectures.
Figure 2B:
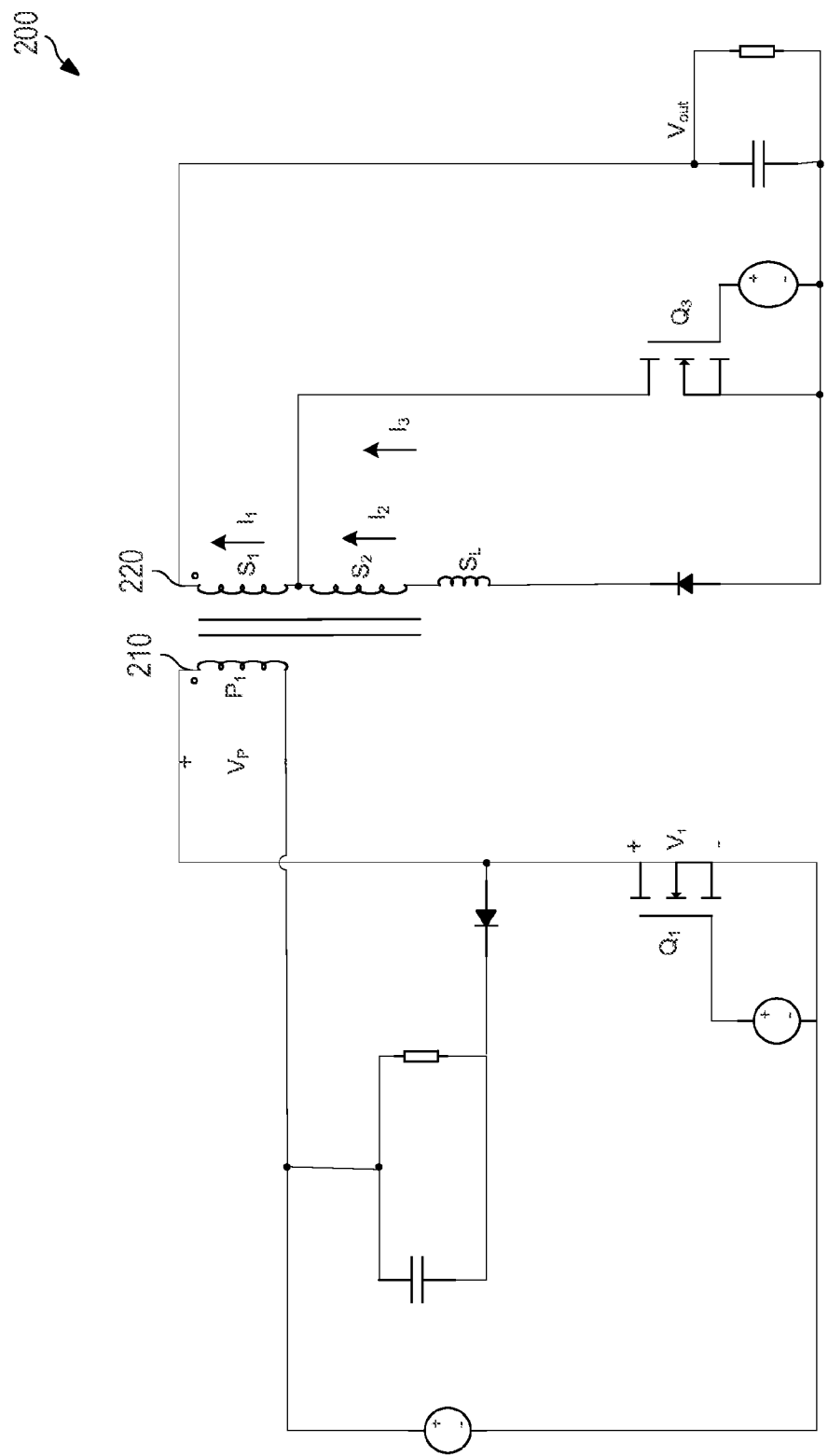

FIGS. 2A-2B illustrate an embodiment flyback converter architecture 200 for achieving zero-voltage switching. The embodiment flyback converter architecture 200 includes a primary circuit, a secondary circuit, and a transformer for transferring power from the primary circuit to the secondary circuit. The primary circuit of the embodiment flyback converter architecture 200 includes a primary switching transistor ($Q_1$) and a primary winding 210 of the transformer. The primary switching transistor ($Q_1$) is activated (e.g., closed) to initiate a charging of the primary winding 110, and de-activated (e.g., opened) to initiate a transfer of electromagnetic energy stored in the primary winding 110 to the secondary circuit.

The secondary circuit includes a secondary switching transistor ($Q_3$), a secondary winding 220 of the transformer, a series inductor ($S_L$), and either a transistor ($Q_2$) or a diode (D1) as shown in FIGS. 2A and 2B, respectively. In some embodiments, an inductance of the series inductor ($S_L$) comprises a fraction (e.g., ten percent, etc.) of the inductance of the secondary side transformer (S1). The secondary winding 220 includes a first winding portion ($S_1$) and a second winding portion ($S_2$). In embodiments, the secondary winding 220 is electromagnetically coupled to the primary winding 210 such that a voltage differential across the primary winding 210 corresponds to a voltage differential across the first winding portion ($S_1$) of the secondary winding 220.

Figure 2C:
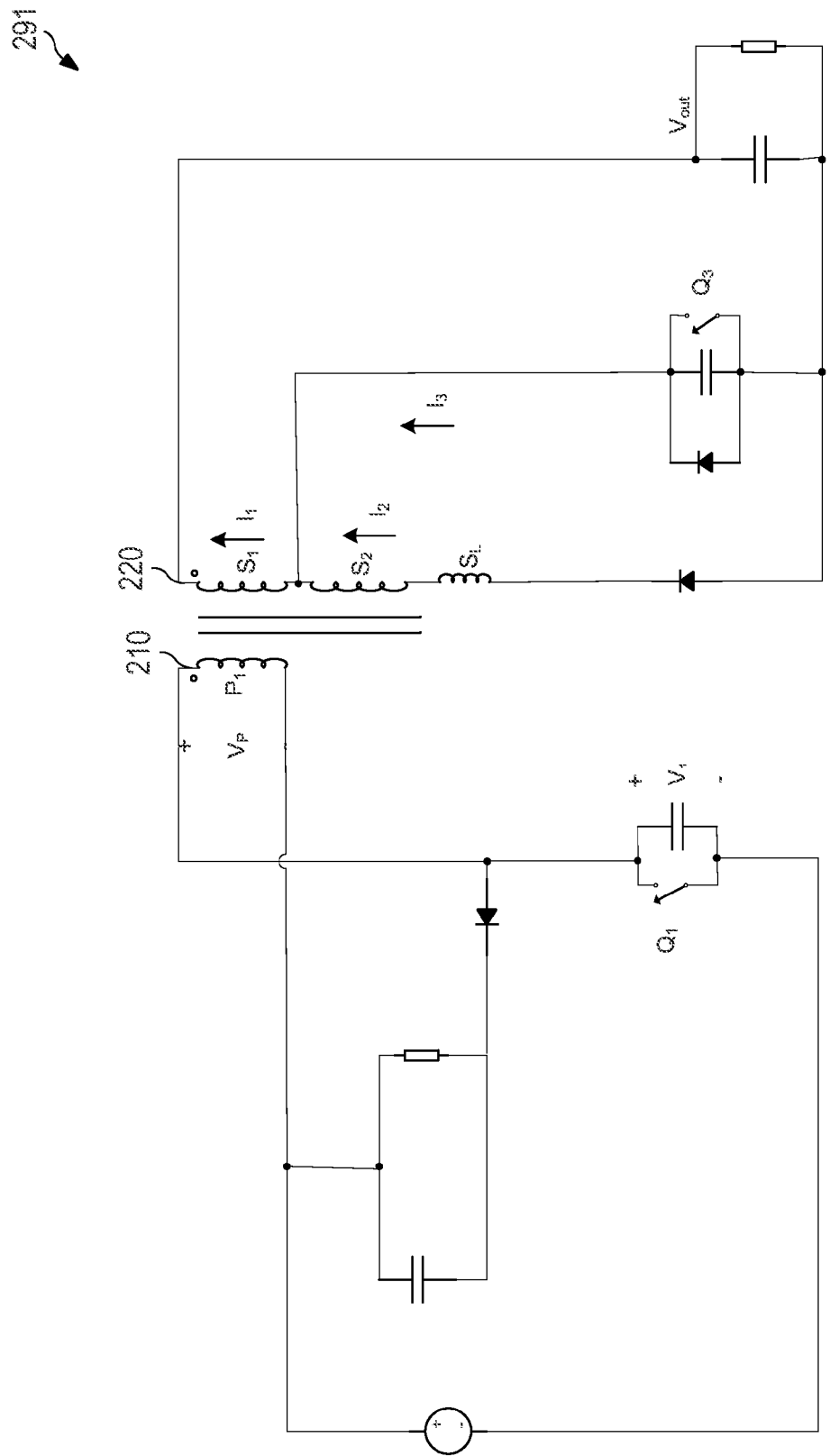

The secondary switching transistor ($Q_3$) may be manipulated (e.g., closed) to produce a current imbalance between the first winding portion ($S_1$) and the second winding portion ($S_2$) of the secondary winding 220 during a discharge cycle. The current imbalance may be produced as a result of energy stored in the series inductor. After creating the current imbalance, the secondary switching transistor ($Q_3$) may be de-activated (e.g., opened) to drive the voltage at the common node and let the current imbalance reverse the voltage differential across the first winding portion ($S_1$) of the secondary winding 220. This may, in turn, reverse the voltage differential over the primary winding 210, e.g., $V_D<0$, or otherwise reduce the voltage differential over the primary winding below a voltage threshold that provides a small (or manageable) power loss, e.g., $V_D<V_{threshold}$. As a result, the voltage potential ($V_1$) across the source-drain of the primary switching transistor ($Q_1$) may be discharged into the primary winding 210 of the transformer, thereby enabling zero-voltage switching of the primary switching transistor ($Q_1$). FIG. 2C illustrates a simplified diagram 291 of the embodiment flyback converter architecture 200. In the simplified diagram 291, the primary switching transistor ($Q_1$) is represented as a switch coupled in parallel with a capacitor, and the secondary switching transistor $Q_3$ is represented as a switch coupled in series with a capacitor and a body diode.

Figure 3:
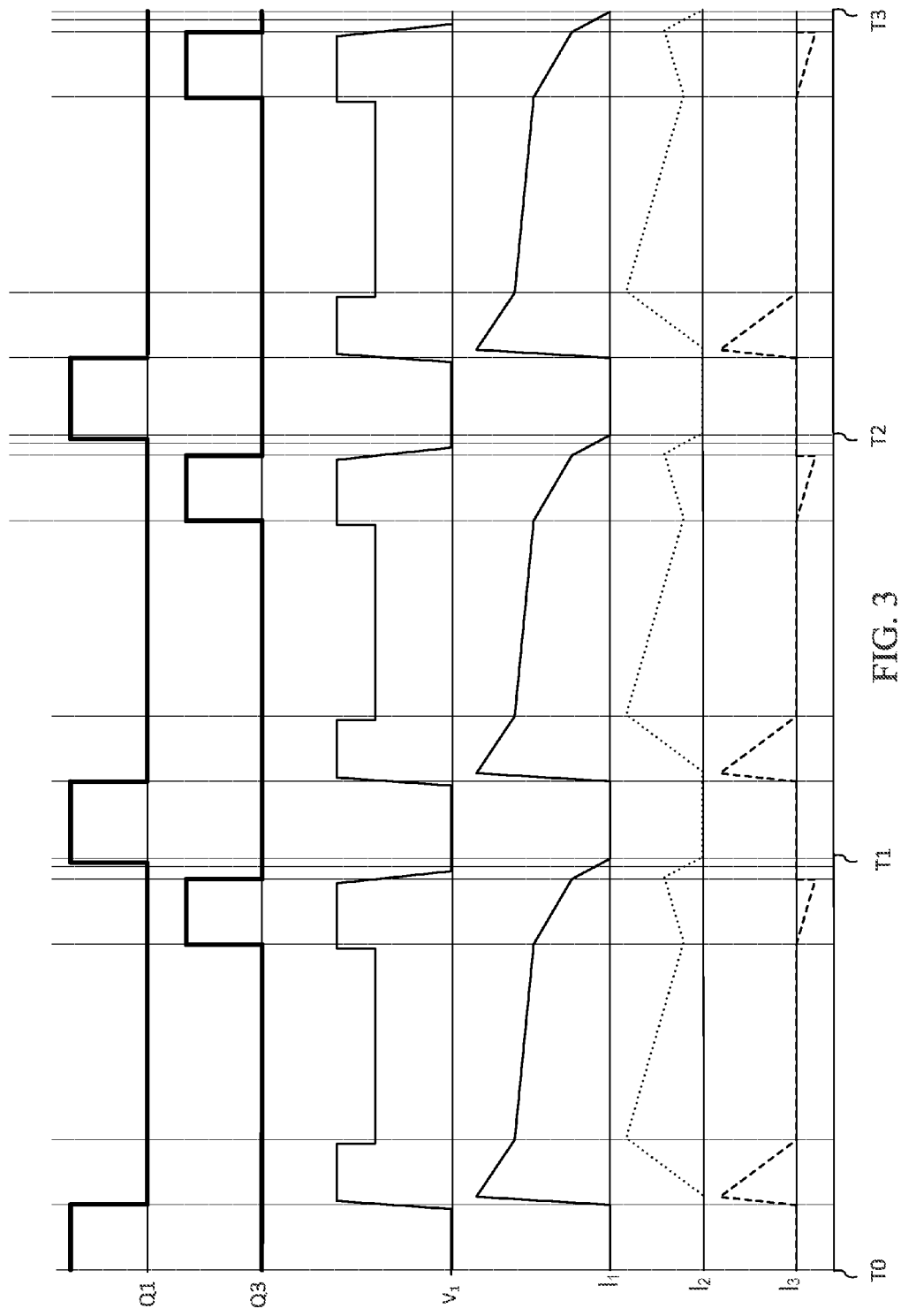
FIG. 3 illustrates a timing diagram of current and voltage readings of an embodiment flyback converter architecture over multiple iterations of zero-voltage switching.

The manipulation of the primary and secondary switching circuits to achieve zero-voltage switching may occur over a sequence of phases. FIG. 3 illustrates a timing diagram of the current and voltage readings of the embodiment flyback converter architecture 200 over three iterations of zero voltage switching. As shown, the first interval runs from T0 to T1, the second interval runs from T1 to T2, and the third interval runs from T2 to T3, with each interval comprising six phases. While the embodiment flyback architectures are described as operating in six phases throughout this disclosure, those of ordinary skill in the art will recognize that embodiment architectures can achieve zero-voltage switching in different numbers of phases as well. As used herein, zero-voltage switching refers to activating (e.g., closing) the primary switching element when a voltage potential ($V_1$) across the source-drain is less than a threshold. In some embodiments, zero-voltage switching occurs when the voltage potential ($V_1$) is zero. In other embodiments, zero-voltage switching occurs when the voltage potential ($V_1$) is slightly positive. In yet other embodiments, zero-voltage switching occurs when the voltage potential ($V_1$) is negative.

Figure 4:
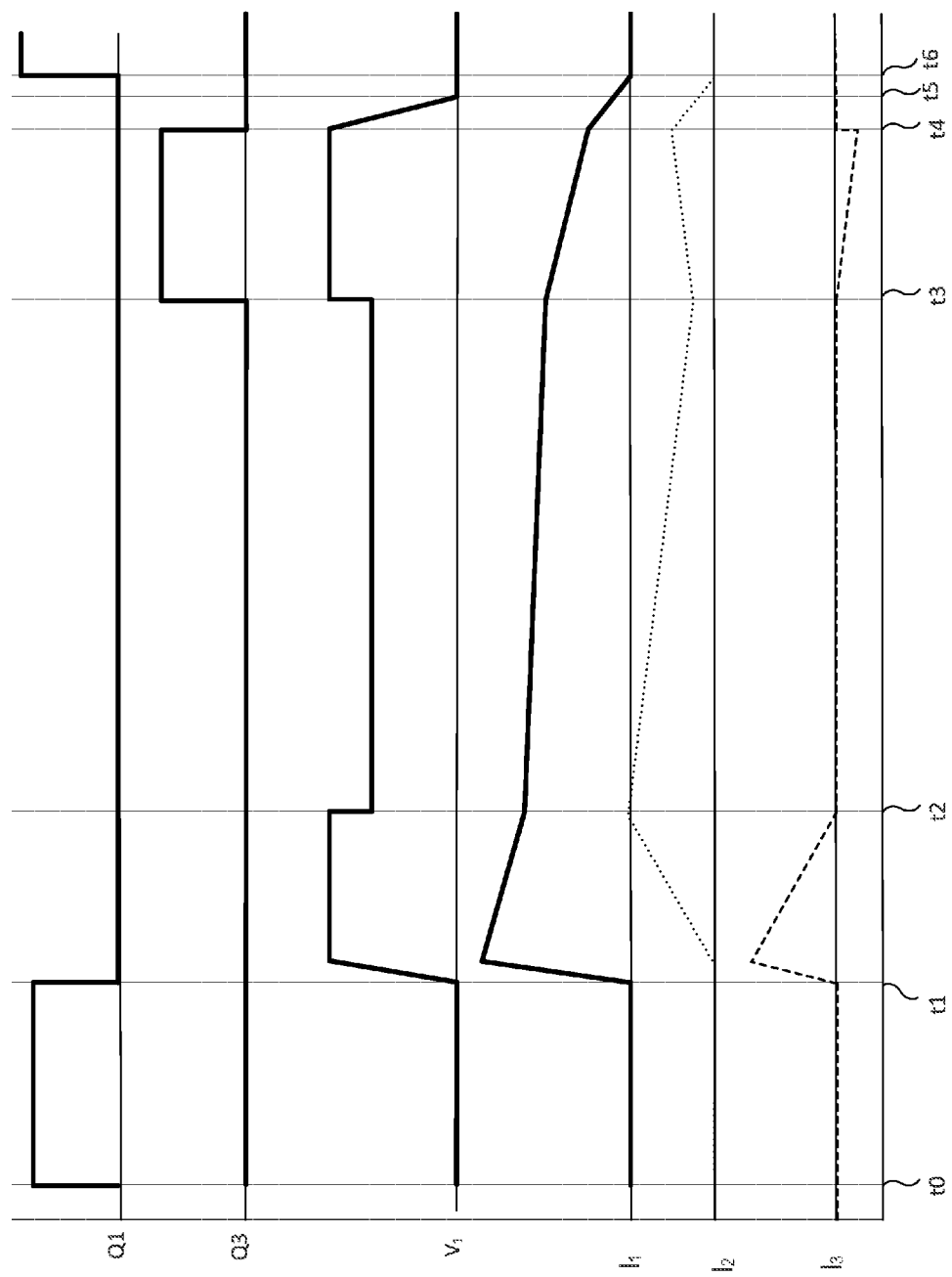
FIG. 4 illustrates a timing diagram of current and voltage readings of an embodiment flyback converter architecture over different phases of a single zero-voltage switching iteration.
Figure 5A:
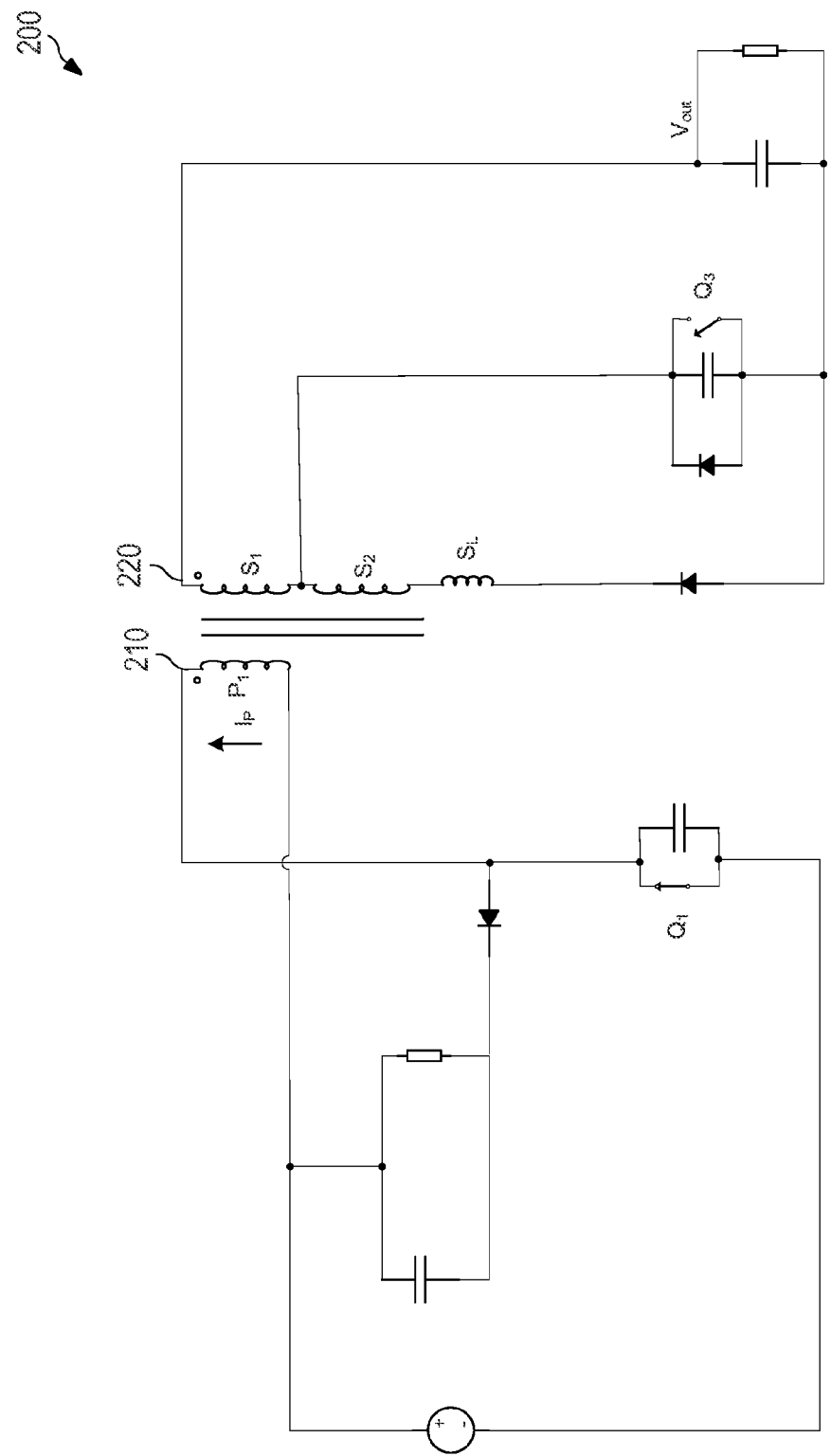
FIGS. 5A-5G illustrate diagrams of an embodiment flyback converter architecture in different phases of a zero-voltage switching iteration.

FIG. 4 illustrates a timing diagram of the current and voltage readings of the embodiment flyback converter architecture 200 over a single iteration of zero-voltage switching. As shown, the single iteration of zero-voltage switching includes six phases, namely: a first phase running from t0 to t1; a second phase running from t1 to t2; a third phase running from t2 to t3; a fourth phase running from t3 to t4; a fifth phase running from t4 to t5; and a sixth phase running from t5 to t6. These six phases will now be described with reference to the diagrams depicted in FIGS. 5A-5F. The first phase begins (at T=t0), when the primary switching transistor ($Q_1$) is activated (closed) to induce a current ($I_P$) through the primary winding 210 as demonstrated by FIG. 5A. At this time, the secondary switching transistor ($Q_3$) is de-activated (e.g., opened). Once the charging cycle is complete, the primary switching transistor ($Q_1$) is de-activated (e.g., opened) to induce a discharging of the transformer through the secondary circuit, which marks a transition from the first phase to the second phase at T=t1.

Figure 5B:
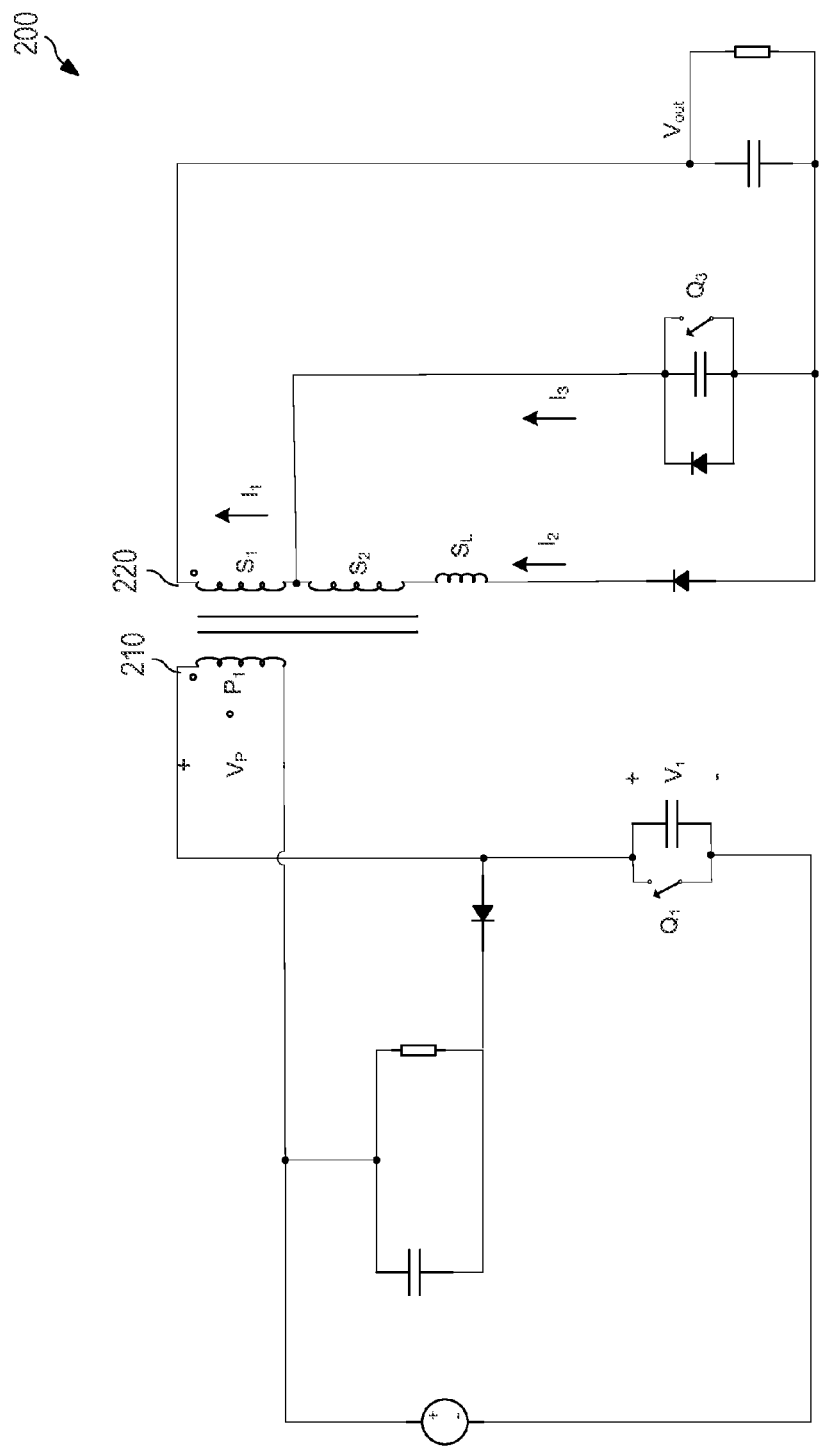

During the second phase, both the primary and secondary switching elements remain deactivated as demonstrated by FIG. 5B. Discharging of the transformer through the secondary circuit produces a current ($I_1$) through the first winding portion ($S_1$) of the secondary winding 220. Initially, most of the current ($I_1$) is drawn through the body diode of the secondary switching transistor, as represented by the current ($I_3$). However, as time progresses (e.g., from T=t1 to T=t2), increasing amounts of the current ($I_1$) is drawn through the second winding portion ($S_2$) of the secondary winding 220 as represented by the current ($I_2$).

Figure 5C:
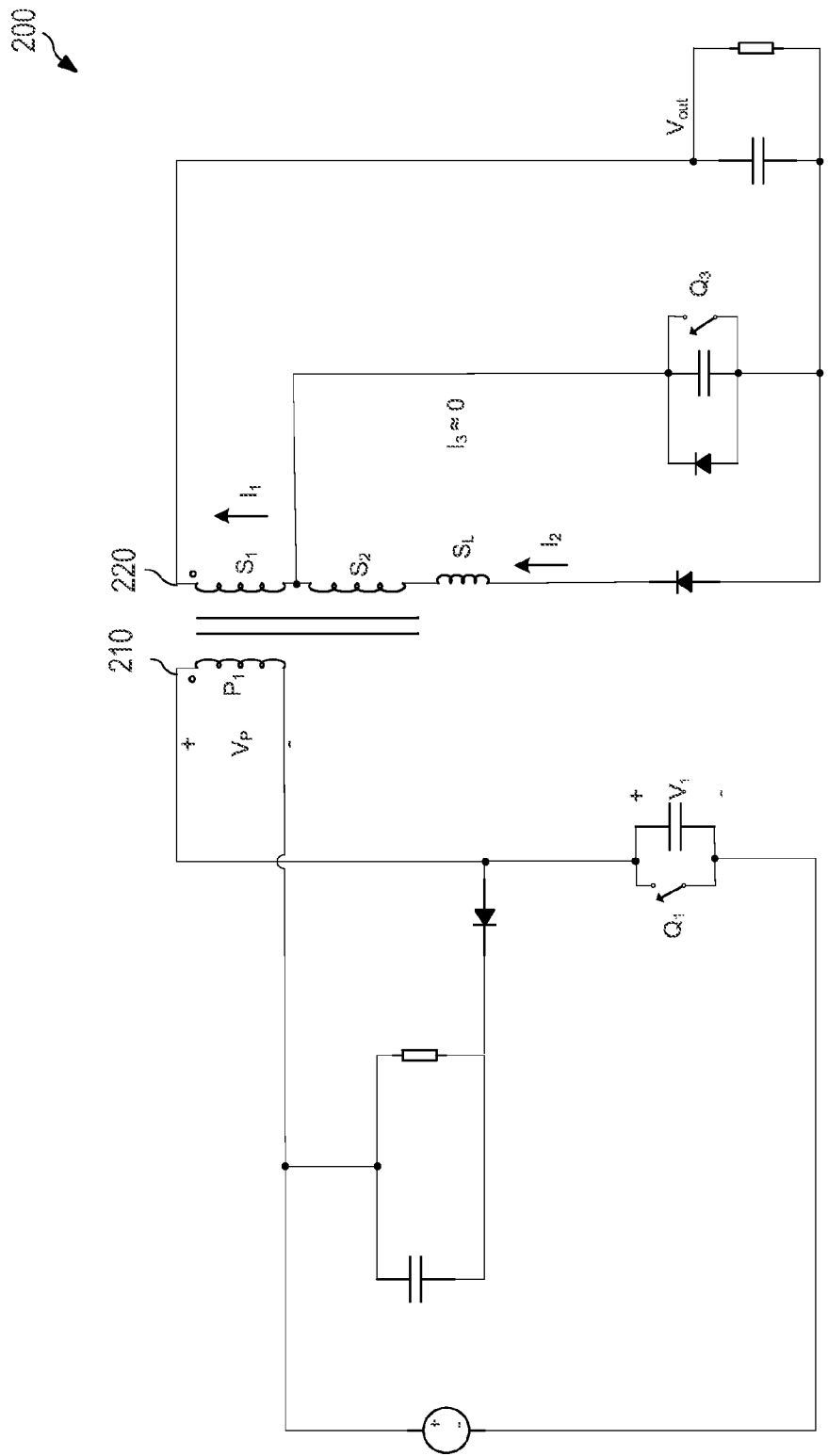

The circuit transitions from the second phase to the third phase (at T=t2) when the body diode of the secondary switching element ($Q_3$) stops conducting (e.g., $I_3 \approx 0$) as demonstrated in FIG. 5C. At this time, the current ($I_1$) is drawn almost entirely through the second winding portion ($S_2$) of the secondary winding (e.g., $I_1 \approx I_2$), and both the first winding portion ($S_1$) and second winding portion ($S_2$) of the secondary winding 220, as well as the series inductor ($S_L$), begin discharging. This phase constitutes the period where most of the energy transfer from the secondary winding 220 to the load occurs.

Figure 5D:
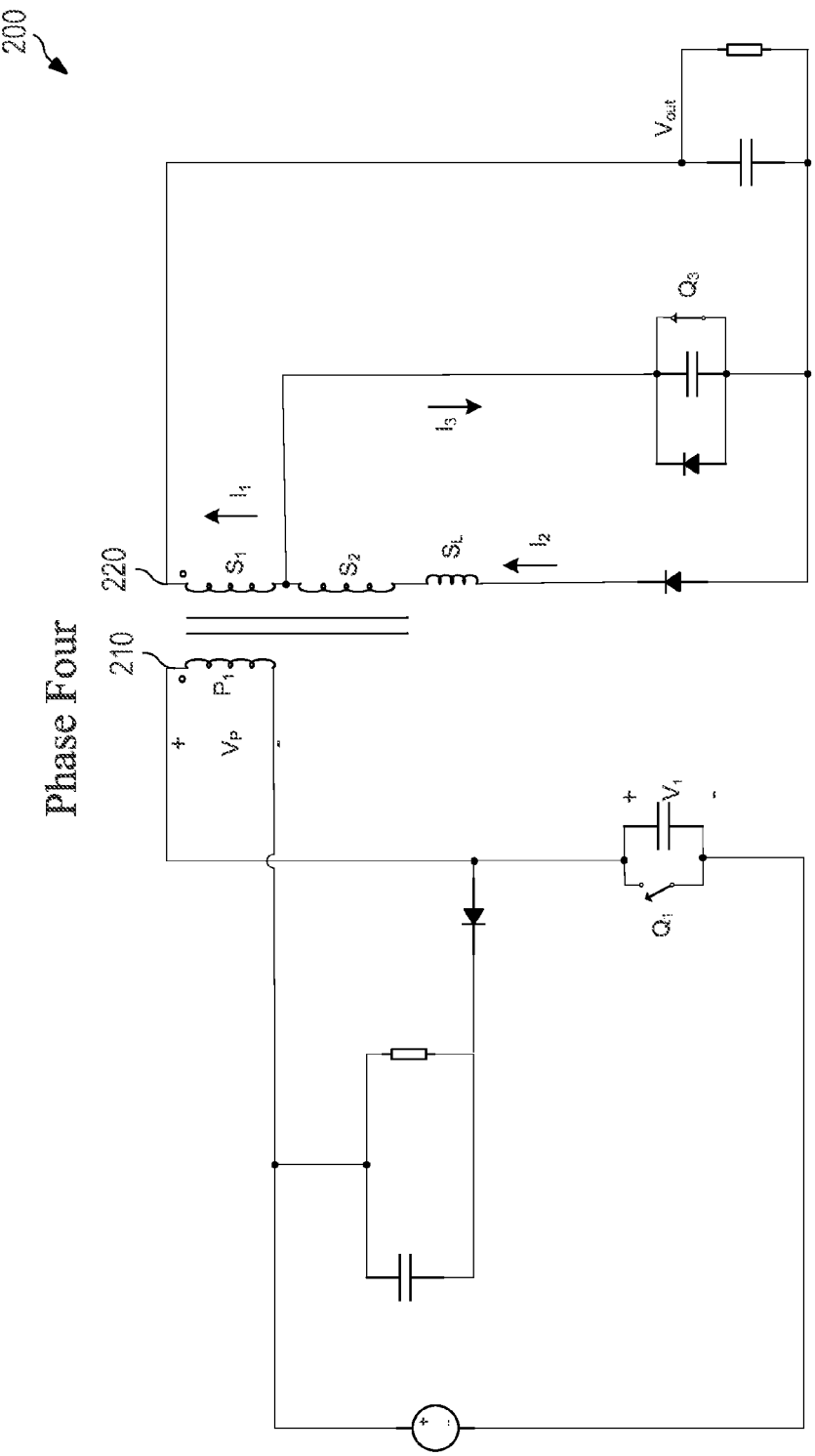

Before the current ($I_1$) reaches zero, the secondary switching element ($Q_3$) is activated to transition the circuit from the third phase to the fourth phase (at T=t3) as demonstrated by FIG. 5D. In an embodiment, the switching element ($Q_3$) is activated when a current (e.g., $I_1$, $I_2$, etc.) falls below a threshold. In another embodiment, the switching element ($Q_3$) is activated when a voltage (e.g., $V_S$, $V_D$, etc.) falls below a threshold. At this time, energy transferred (e.g., released) from the series inductor ($S_L$) creates a current imbalance between the current ($I_1$) and the current ($I_2$), e.g. $I_2>I_1$. As a result, some of the current ($I_2$) is drawn through the secondary switching transistor ($Q_3$), thereby driving the current ($I_3$) negative during the fourth stage (e.g., from T=t3 to T=t4).

Figure 5E:
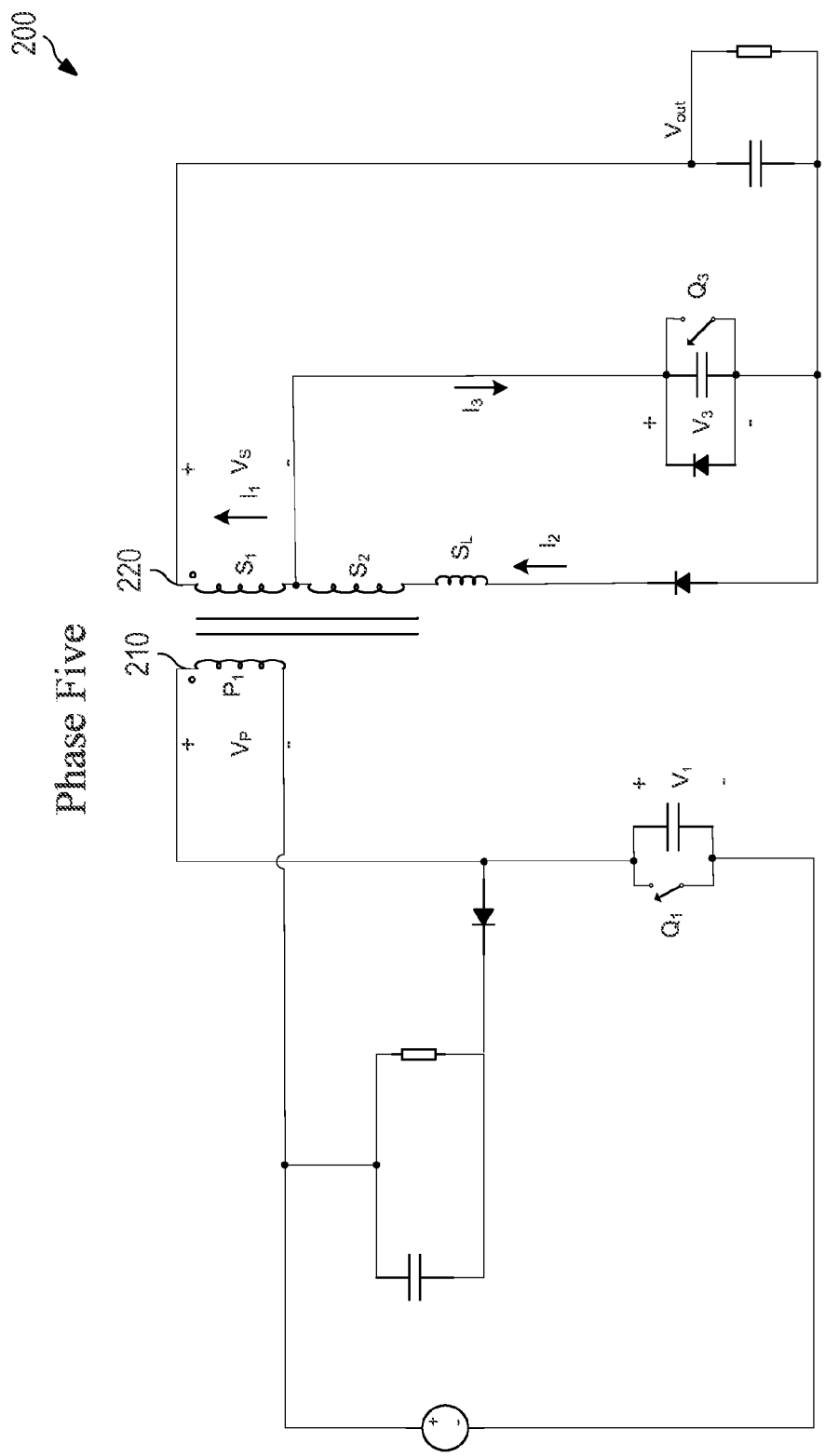

The secondary switching transistor ($Q_3$) is de-activated (e.g., opened) to transition the circuit to the fifth stage (at T=t4) as demonstrated by FIG. 5E. During this stage, the current imbalance between the first winding portion ($S_1$) and second winding portion ($S_2$) of the secondary winding (e.g., $I_2>I_1$) creates a voltage potential ($V_3$) between the drain-source path of the secondary switching transistor ($Q_3$). This voltage potential drives the common node voltage at the common node between the first winding portion ($S_1$) and the second winding portion ($S_2$) of the secondary winding 220, thereby reducing a voltage differential ($V_S$) across the first winding portion ($S_1$) of the secondary winding 220 during the fifth stage. Due to the electromagnetic coupling relationship between the primary winding 210 and secondary winding 220, the reduction in the voltage differential ($V_S$) across the first winding portion ($S_1$) of the secondary winding 220 causes in a corresponding reduction in the voltage differential ($V_D$) across the primary winding 210. In some embodiments, the polarity of one or both of the voltage differential ($V_S$) and/or the voltage differential ($V_S$) is reversed, e.g., $V_S<0$ and/or $V_D<0$. During other embodiments, the voltage differential ($V_S$) and/or the voltage differential ($V_S$) is simply decreased below a threshold, e.g., $V_S<V_{threshold}$ and/or $V_D<V_{threshold}$.

Figure 5F:
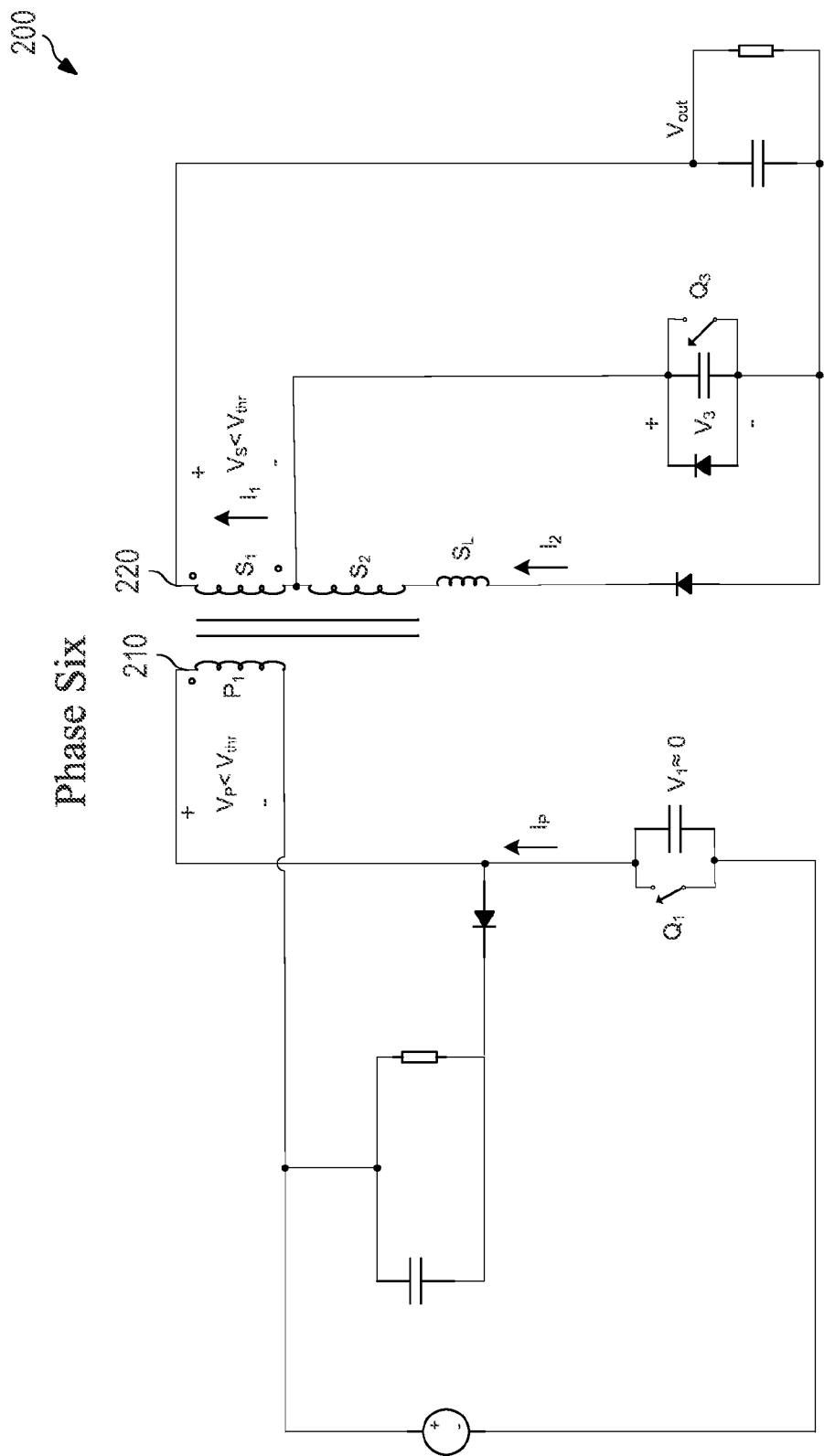
Figure 5G:
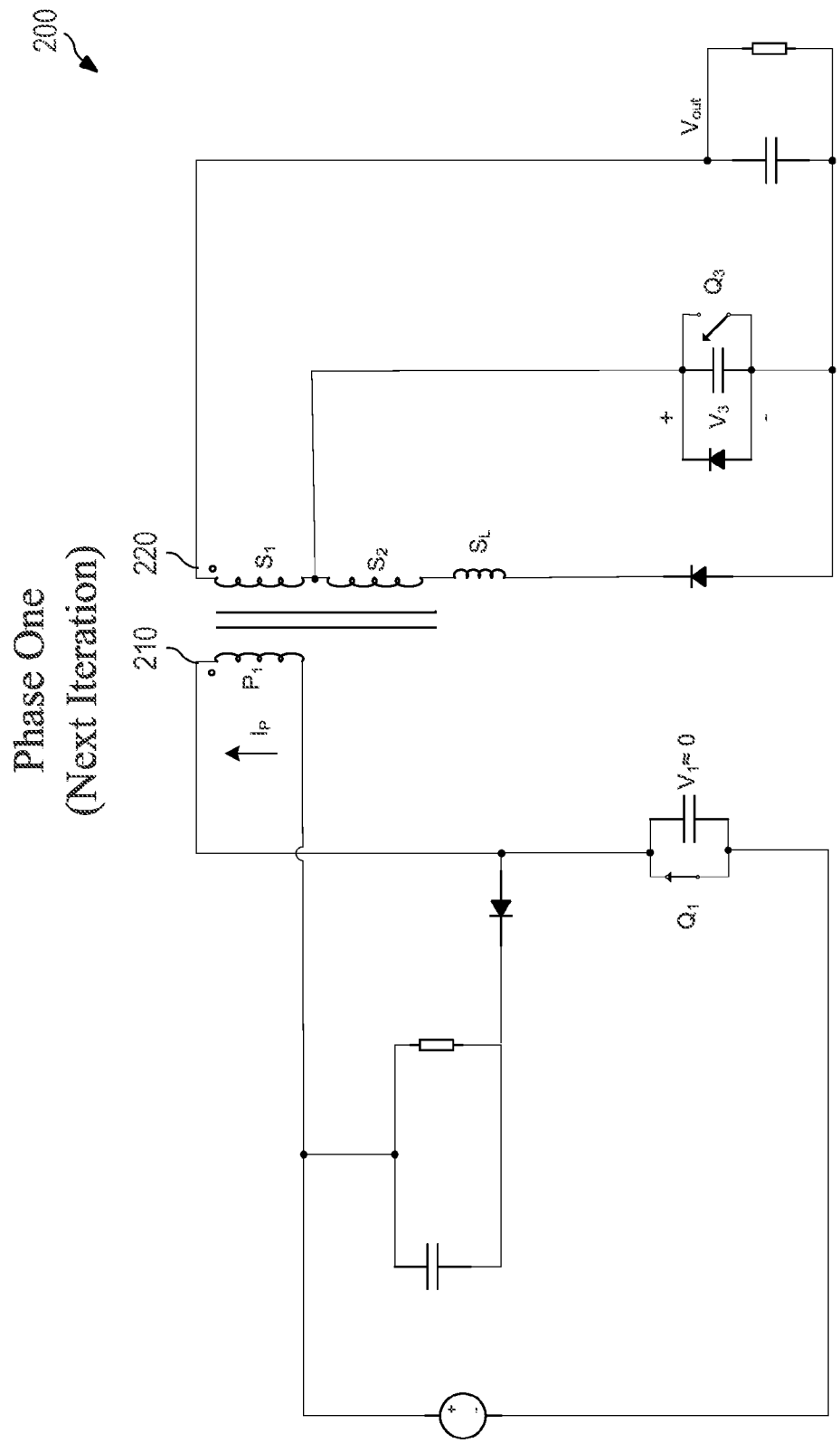

The circuit transitions to the sixth stage (at T=t5) when the voltage differential ($V_D$) across the primary winding 210 falls below a threshold at T=t5 as demonstrated by FIG. 5F. At this point, the voltage potential ($V_1$) between the source and drain of the primary switching transistor ($Q_1$) has substantially into the primary winding 210, where it is stored for conversion during the next iteration. Consequently, the primary switching transistor ($Q_1$) can be activated (e.g., closed) to achieve zero-voltage switching as demonstrated by FIG. 5G, which transitions the circuit back to phase one.

The following observations are relevant to the respective phases. During phase two: When the primary switching inductor is turned OFF, the transformer magnetizing energy will cause its voltage to reverse. Due to the inductance added on the $Q_2$ path, current will first flow through $Q_3$ body diode. This effectively places transformer $S_2$ winding and $S_L$ in parallel and part of TX1 current will be diverted into this loop at current build up in $S_L$. During this phase, winding voltage may be approximately equal to Vout/Ns1.

During phase three: When $S_L$ current becomes equal to transformer $S_1$ current, $Q_3$ body diode may stop conducting, and $S_L$, $S_2$ and S3 may start discharging. During this phase, the majority of current may flow through $Q_2$ that can be controlled as any synchronous MOSFET (or a diode). Because winding voltage may be lower during phase three than during phase two (e.g., it is now shared between $S_1/S_2$ in series and $S_L$), the current di/dt may not be reduced. On the primary side, this may cause $Q_1$ drain voltage to drop. In some implementations, an undesirable parasitic oscillation may happen during this phase with high Q factor, due to un-dampened drain-source capacitance in $Q_3$. This phase may provide most of the energy transfer.

During phase four: Before TX1 current reaches zero, the secondary switching transistor ($Q_3$) may be switched on. Similar to phase two, this will result in additional current building up inside $S_L$. At the same time, higher winding voltage for TX1 will result in faster current discharge. This will lead to a current imbalance between $S_L$ and TX1 with $S_L$ having higher current than TX1.

During phase five: At the moment the secondary switching transistor ($Q_3$) is turned OFF, the current imbalance created during phase four will cause voltage on the secondary switching transistor ($Q_3$) drain to rise. This is due to its capacitance receiving more current from $S_1/S_2$ than $S_1$ draw. As long as $S_L$ stored energy is high enough to charge the drain-source capacitance of $Q_3$, $Q_3$ drain voltage will keep rising, resulting in a voltage reversal of TX1.

During phase six: At this point of time, the primary switching transistor ($Q_1$) may be activated without "turn ON losses" persistent in conventional CCM flyback circuit architectures. The series inductor ($S_L$) may be discharged relatively quickly depending on its dimensions. When the $S_L$ current reaches zero, the switching transistor ($Q_2$) can be turned OFF, as expected of any synchronous MOSFET. Thereafter, there will be little or no current on secondary circuit.

Aspects of this disclosure provide the following advantages: reduce "turn ON losses" related to switching through zero-voltage switching; allow for higher operating frequencies by virtue of operating in CCM; operate without an opto-coupler (e.g., less problems with aging opto-couplers, less losses attributable to linear regulator quiescent current, etc.); allows use of magnetic components (even at equivalent frequency) and capacitor size reduction by virtue of operating in CCM; simplified SR controller in CCM (mitigates or removes shoot trough issue of traditional solutions); remove hard switching EMI Generation; μC present on output allows communication in application.

Reversal of transformer voltage may allow operation without opto-coupler. In some embodiments, this may be used by the primary side as a control signal. A regulator may receive this signal after a fixed amount of time. A secondary side controller may generate this signal with a delta (in time), which may be used by the primary side to determine whether power should be increased (delta positive) or decreased (delta negative).

In some embodiments, transition delays are reduced by synchronizing the SR MOSFET with the Q3 signal. More specifically, conventional SR controllers synchronize their state to that of the primary side by sensing the current signal used to activate/de-activate the MOSFET. In CCM flyback circuits, the current signal typically passes through the drain of the MOSFET prior to being sensed by the SR controller, which introduces a delay between transitioning of the MOSFET and sensing/transition of the SR controller. During the delay period, a current with large di/dt charges the leakage inductance of the transformer by siphoning energy from both primary and secondary side, thereby resulting in power loss and additional stress on the components. Embodiments of this disclosure reduce the aforementioned delay by synchronizing the SR controller with Q3 signals, which reduces power loss and component stress as well as mitigates the risk of SR overshoot. Synchronizing the SR controller with the Q3 signal may also simplify the SR controller.

Embodiments of this disclosure remove hard switching EMI generation. While using hard switching flyback in traditional CCM flyback converters, the primary side MOSFET is typically designed to either switch as fast as possible (e.g., to reduce current voltage crossover losses) or to switch smoothly to avoid EMI generation (e.g., make smooth dV/dt on drain to avoid high frequency emission). Embodiments of this disclosure allow the primary side MOSFET to experience edges that are not related to its switching speed, but to the LC time constant present on the drain. This allows the harmonic content to not only be reduced (e.g., LC transitions are smoother than hard turn on transition), but also to be made independent of power MOSFET speed.

Aspects of this disclosure provide μC on the output to allow communication in applications. Having a controller on the secondary side may allow the introduction of additional features.

Figure 6:
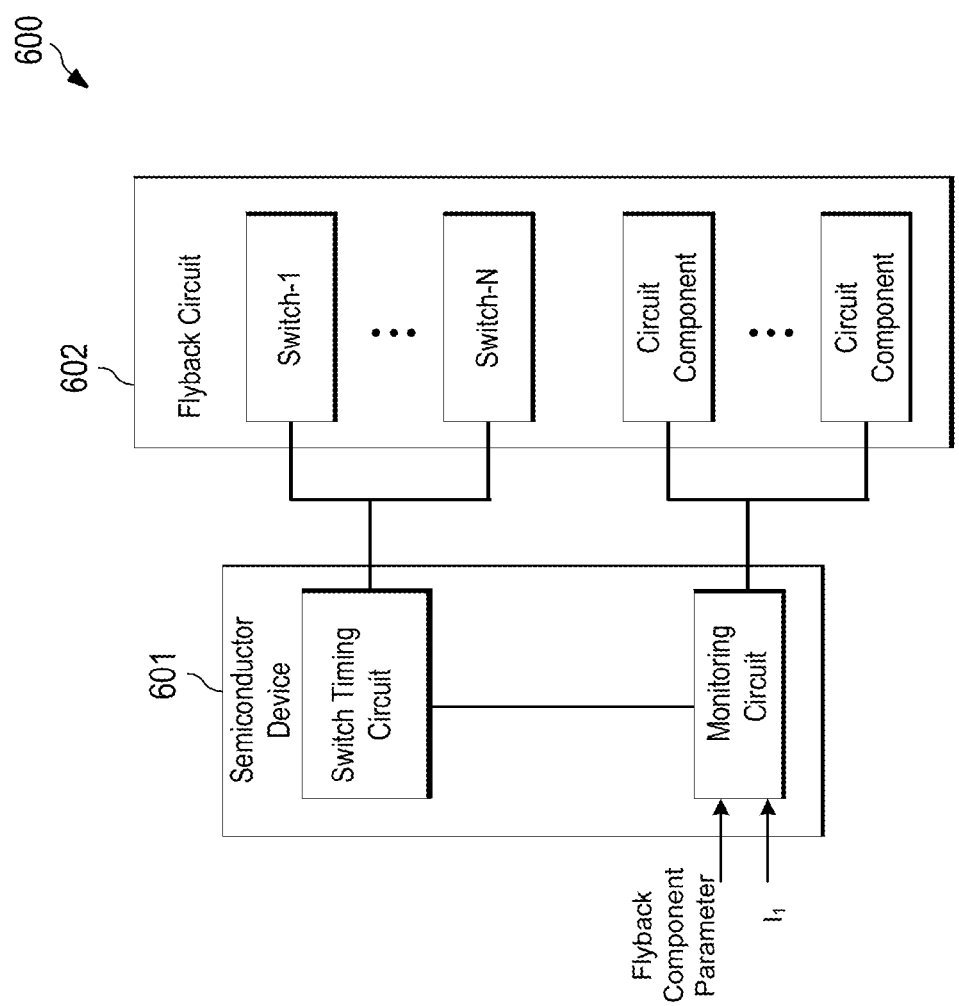
FIG. 6 illustrates a block diagram of an embodiment flyback converter.

FIG. 6 illustrates an embodiment flyback converter 600 that includes a semiconductor device 601 and a flyback circuit 602. As shown, the semiconductor device 601 includes a switch timing circuit and a monitoring circuit. The monitoring circuit is coupled to one or more circuit components of the flyback circuit 602, and is configured to monitor parameters associated with those components, e.g., voltage, current, etc. The circuit components in the flyback circuit 602 may include any component (or interconnection between components), including series connectors, inductors, transistors, switches, windings, etc. The switch timing circuit has an input port coupled to the monitoring circuit, and output ports configured to control one or more switches in the flyback converter based on the monitored parameters. In some embodiments, the switches may be external to the semiconductor device 601 (as depicted in FIG. 6). In other embodiments, one or more of the switches may be an internal component to the semiconductor device.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

What is claimed is:

1. A method of operating a switched-mode power supply, the method comprising:

de-activating a first switch coupled to a primary winding of a transformer in the switched-mode power supply to create a voltage difference across the primary winding of the transformer, the transformer comprising a secondary winding that includes at least a first winding portion coupled in series with a second winding portion, wherein an inductor is coupled in series to the second winding portion of the secondary winding;

activating a second switch to generate a current imbalance between the first winding portion and the second winding portion of the secondary winding, wherein a load path of the second switch is coupled to a common node, the common node being common to both the first winding portion and the second winding portion of the secondary winding, and wherein the current imbalance between the first winding portion and the second winding portion of the secondary winding comprises an excess current that flows through the second winding portion of the secondary winding without flowing through the first winding portion of the secondary winding;

de-activating the second switch to reduce a voltage difference across the first winding portion of the secondary winding; and re-activating the first switch to initiate charging of the transformer in the switched-mode power supply after the de-activating the second switch.

2. The method of claim 1, wherein reducing the voltage difference across the first winding portion of the secondary winding reduces the voltage difference across the primary winding.

3. The method of claim 1, wherein the transformer in the switched-mode power supply operates in a constant conductance mode (CCM).

4. The method of claim 1, wherein the excess current is at least partially diverted from the common node through the load path of the second switch.

5. The method of claim 1, wherein the excess current is at least partially attributable to electromagnetic energy stored in the inductor coupled to the second winding portion of the secondary winding.

6. The method of claim 5, wherein the second winding portion of the secondary winding is coupled between the inductor and the common node.

7. The method of claim 1, wherein the primary winding and the secondary winding are magnetically coupled such that the voltage difference across the first winding portion of the secondary winding corresponds to the voltage difference across the primary winding.

8. A method of operating a switched-mode power supply, the method comprising:

de-activating a first switch coupled to a primary winding of a transformer in the switched-mode power supply to create a voltage difference across the primary winding of the transformer, the transformer comprising a secondary winding that includes at least a first winding portion coupled in series with a second winding portion, wherein an inductor is coupled in series to the second winding portion of the secondary winding;

activating a second switch to generate a current imbalance between the first winding portion and the second winding portion of the secondary winding, wherein a load path of the second switch is coupled to a common node, the common node being common to both the first winding portion and the second winding portion of the secondary winding, wherein activating the second switch to generate a current imbalance between the first winding portion and the second winding portion of the secondary winding comprises detecting that a current flowing through the first winding portion of the primary winding has fallen below a threshold, and activating the second switch when the current flowing through the first winding portion of the primary winding has fallen below the threshold;

de-activating the second switch to reduce a voltage difference across the first winding portion of the secondary winding; and re-activating the first switch to initiate charging of the transformer in the switched-mode power supply after the de-activating the second switch.

9. A semiconductor device comprising:

a monitoring circuit adapted to monitor a component in a switched-mode power supply, wherein a transformer in the switched-mode power supply includes a primary winding coupled to a primary-side switch, and a secondary winding that includes at least a first winding portion coupled in series with a second winding portion, and wherein an inductor is coupled in series to the second winding portion of the secondary winding;

a switch timing circuit coupled to the monitoring circuit, the switch timing circuit adapted to control at least a secondary-side switch having a load path coupled to a common node positioned in-between the first winding portion and the second winding portion of the secondary winding, wherein the switch timing circuit is configured to activate the secondary-side switch to create a current imbalance between the first winding portion and the second winding portion from energy stored in the inductor, and to de-activate the secondary-side switch to produce a voltage potential at the common node from the current imbalance between the first winding portion and the second winding portion, and wherein producing the voltage potential at the common node reduces a voltage difference across the first winding portion of the secondary winding.

10. The semiconductor device of claim 9, wherein reducing the voltage difference across the first winding portion of the secondary winding reduces a voltage difference across the primary winding.

11. The semiconductor device of claim 10, wherein reducing the voltage difference across the primary winding decreases a voltage potential across the load path of the primary-side switch prior to the primary-side switch being re-activated in a subsequent charging phase of the transformer.

12. The semiconductor device of claim 10, wherein the primary winding and the secondary winding are magnetically coupled such that the voltage difference across the first winding portion of the secondary winding corresponds to the voltage difference across the primary winding.

13. The semiconductor device of claim 9, wherein the transformer in the switched-mode power supply operates in a constant conductance mode (CCM).

14. The semiconductor device of claim 9, wherein the monitoring circuit is configured to monitor a current flowing through the first winding portion of the secondary winding.

15. The semiconductor device of claim 14, wherein the switch timing circuit is configured to activate the secondary-side switch when the monitoring circuit indicates that the current flowing through the first winding portion of the primary winding has fallen below a threshold.

16. The semiconductor device of claim 9, wherein the current imbalance between the first winding portion and the second winding portion of the secondary winding is at least partially attributable to an excess current that flows through the second winding portion of the secondary winding without flowing through the first winding portion of the secondary winding, the excess current being at least partially diverted from the common node through the load path of the secondary-side switch.

17. The semiconductor device of claim 9, wherein the second winding portion of the secondary winding is coupled between the inductor and the common node.

18. A switched-mode power supply comprising:

a transformer comprising a secondary winding that includes at least a first winding portion and a second winding portion;

a primary-side switch coupled to a primary winding of the transformer;

a secondary-side switch coupled to a common node positioned in-between the first winding portion and the second winding portion of the secondary winding; and an inductor coupled in series to the secondary winding, wherein the primary winding is magnetically coupled to the secondary winding without being magnetically coupled to the inductor, wherein the second winding portion of the secondary winding is coupled between the common node and the inductor, and wherein energy stored in the inductor creates a current imbalance between the first winding portion and the second winding portion when the secondary-side switch is activated.

19. The switched-mode power supply of claim 18, wherein the first winding portion and the second winding portion are wound around a common core, and wherein the inductor is not wound around the common core.

* * * * *